Oct. 19, 1965  H. J. McCARRICK  3,213,244
MOTION TRANSLATING AND AMPLIFYING DEVICES
Filed Jan. 2, 1963  2 Sheets-Sheet 1
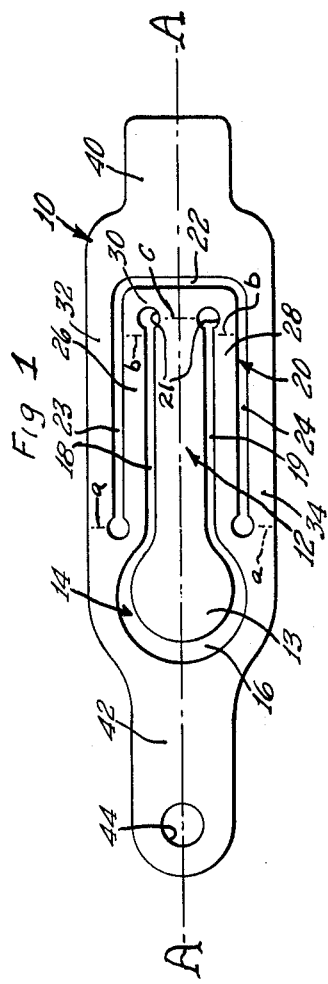
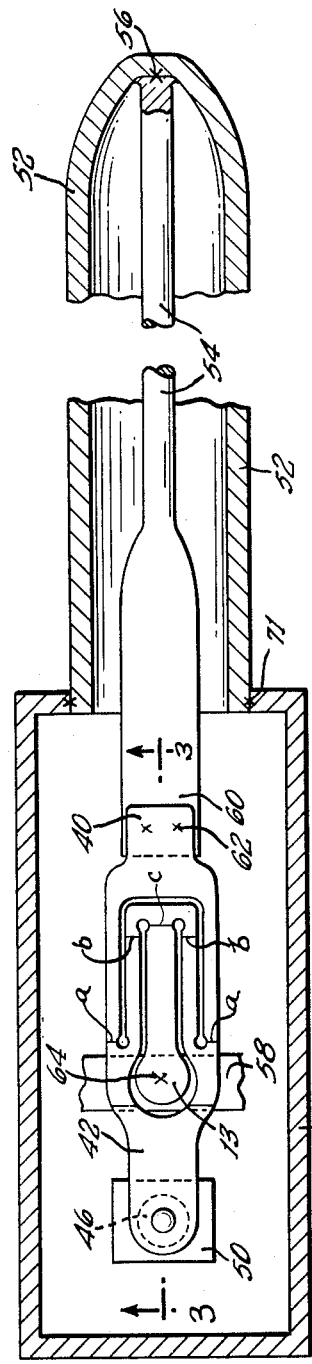

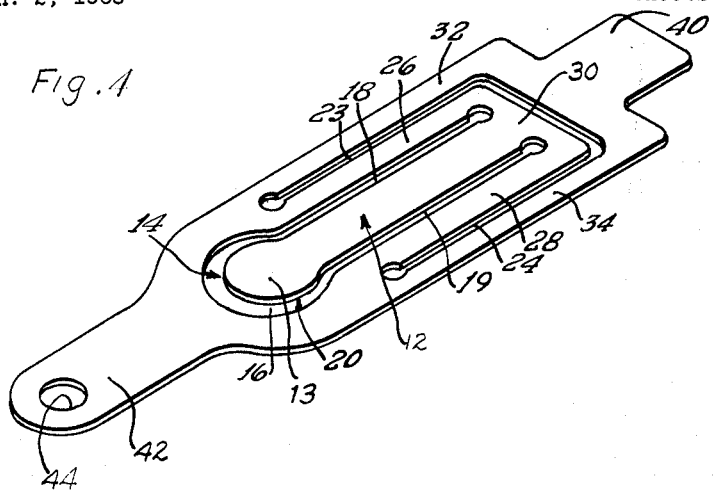
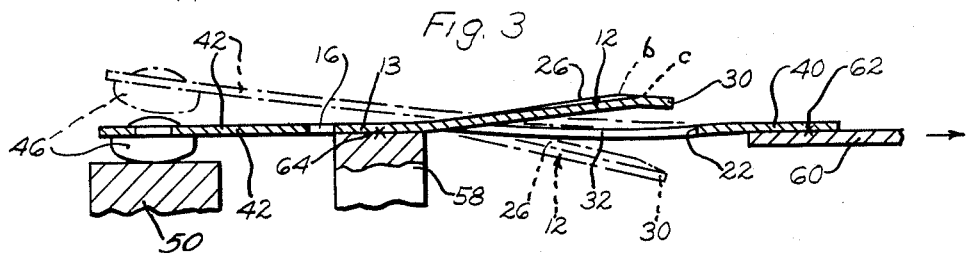

United States Patent Office 3,213,244
Patented Oct. 19, 1965

3,213,244
MOTION TRANSLATING AND AMPLIFYING DEVICES
Henry J. McCarrick, Middleboro, Mass., assignor to Texas Instruments Incorporated, Dallas, Tex., a corporation of Delaware
Filed Jan. 2, 1963, Ser. No. 249,094
2 Claims. (Cl. 200—137)

This invention relates to motion translating and amplifying devices and with regard to certain more specific features to mechanical snap-acting devices which will translate a gradual small movement into an amplified snap-acting movement.

Among the several objects of this invention may be noted the provision of motion translating devices with large motion amplification; the provision of such devices, which in response to a small actuating displacement or movement applied in one direction, will amplify and translate the same into useful amplified movement in another direction; the provision of such devices, which in the snap-acting form, will translate a small gradual movement into a comparatively large snap-acting movement; the provision of such devices, which in the snap-acting form, will generate loading and overcentering forces in response to a single actuating force or displacement; the provision of devices of the class described which are particularly adapted for operation of thermally responsive switches, and more particularly miniaturized switches, although having more general uses; and the provision of such devices which are adapted to be manufactured at low cost by simple punching and stamping operations.

Other objects and features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which two of the various possible embodiments of the invention are illustrated:

FIG. 1 is a top plan view illustrating a motion translating and amplifying element according to one form of the invention;

FIG. 2 is a plan view illustrating the usefulness of the FIG. 1 form of the invention as a switch with certain of the parts thereof shown in section and fragmentary form;

FIG. 3 is an enlarged sectional view taken on line 3—3 of FIG. 2 omitting the housing and tube of the switch for clarity of illustration; and FIG. 4 is a perspective view showing the FIG. 1 form of the invention in a stamped but non-deformed condition useful for creep-acting applications.

Similar reference characters indicate corresponding parts throughout the several views of the drawings.

Dimensions of certain of the parts as shown in the drawings may have been modified and/or exaggerated for the purposes of clarity of illustration.

Referring now more particularly to FIG. 1, there is shown a plate or element indicated generally at 10, the total extent of which as raw material was initially in the form of a flat sheet of appropriately springy material and also of electrically conductive material where the device is to be used in electrical switching applications. Suitable examples of such springy electrically conductive material are beryllium-copper, Inconel and Invar. As shown in FIG. 1 such a sheet has, according to the invention, been punched and formed to provide a finished one-piece element which is preferably symmetrical in shape relative to longitudinal centerline A—A. The element includes a central or inner tongue 12 relieved from the remainder of the plate by a generally U-shaped or bicornuous slot indicated generally at 14. Slot 14 has a rounded and enlarged bight portion 16 and substantially parallel side portions 18 and 19 of substantially equal length. At 20 is shown another generally U-shaped or bicornuous slot which has a bight portion 22 and substantially parallel side portions 23 and 24 of substantially equal length. Parallel side portions 18 and 19 of slot 14 are disposed substantially parallel to and extend intermediate side portions 23 and 24 of slot 20. The free ends of slot side portions 18, 19, 23 and 24, terminate in enlarged circular apertures for the purposes of avoiding undesirable stress concentrations and of facilitating forming and bending of the parts for snap action which will be more fully described below.

Slot portions 18, 23 and 19, 24 respectively provide spaced, substantially parallel, opposed inner side arms 26 and 28 each of which are integrally joined with central tongue 12 by a junction portion 30 which is relieved from the remainder of the plate 10 by slot 20. Slot portions 23 and 24 also respectively provide spaced opposed and substantially parallel outer side arms 32 and 34, the right-hand end portions of which (as seen in FIGS. 1 and 2) are integrally connected with a projecting anchoring tab 40. The left-hand ends of each of outer side arms 32 and 34 (as seen in FIGS. 1 and 2) are each respectively flexibly integrally connected or joined to the left-hand end portion of a respective one of inner side arms 26 and 28 and also to an actuator arm or member 42 which extends beyond the left-hand end 13 of tongue 12. End 13 provides an enlarged portion to facilitate anchoring of the tongue to a support. Member 42 is provided with an aperture 44 near its free left-hand end for the reception of an electrical contact 46 as best seen in FIGS. 2 and 3.

The device shown in FIGS. 2 and 3 is in the form of a thermally responsive electrical switch, which includes a suitably mounted electrically conductive contact member 50 positioned to mate with contact 46 carried by actuator member 42. The switch also includes a thermally responsive actuator comprising two elongated members 52 and 54 shown in fragmentary form in FIG. 2. Member 52 is in tube form and is preferably made of a material having a high coefficient of thermal expansion such as, for example, brass. Member 54 is in rod form and is preferably made of a material having a relatively low coefficient of thermal expansion such as Invar, for example. Rod 54 is telecopically disposed with tube 52 and is secured to the closed end portion of tube 52 as by welding at 56, as best seen in FIG. 2.

The switch includes a housing 70 shown in section in FIG. 2, which mounts electrical contact 50 and has a stationary support 58 (shown in fragmentary form) fixedly connected therewith. Support 58 is formed of electrically conductive material and is suitably electrically insulated from contact 50. Housing 70 is preferably formed of metal and is suitably electrically insulated from both contact 50 and stationary support 58. Suitable electrically conductive terminals (not shown) extending exteriorly of housing 70 may be provided for support 58 and contact 50.

The open end portion of tube 52 is mounted on and secured to housing 70 as by welding at 72, as best seen in FIG. 2. If desired, housing 70 can be formed of electrically insulating material, and tube 52 may be secured to housing 70 by other convenient means, such as by threaded connections. The free end 60 of rod 54 projects into the housing 70, as shown.

Tab portion 40 is interconnected with and anchored to the free end 60 of rod 54 as by welding as at 62, as best seen in FIGS. 2 and 3. If desired, element 10 can be electrically insulated from rod 54 by interposing electrical insulation material between tab 40 and end 60 and using a rivet-type connection for these parts. End 13 of inner tongue 12 is interconnected with and anchored to stationary support 58 as by welding at 64.

It will be clear that when rod 54 and tube 52 are exposed to changes (e.g., an increase) in temperature conditions, that differential expansion will result in relative movement between these parts in a manner well-known in the art. This differential expansion also causes end 60 of rod 54 (which acts as one of the supports for element 10) to move relative to fixed support 58 to effect snap-acting or overcentering movement of actuator arm 42 as will be described in greater detail below.

Supports 58 and 60 are preferably initially spaced from each other so that outer side arms 32, 34 and inner tongue 12 initially act as tension members and inner side arms 26 and 28 initially act as compression members. To provide for increased snap motion and for increased overcentering energy of element 10, junction portion 30 is bent downwardly (as shown in solid lines in FIG. 3) about bend lines $b$ and $c$ (shown in broken lines in FIGS. 1 and 2) and outer arms 32 and 34 are also bent downwardly about bend lines $a$, shown in broken lines in FIGS. 1 and 2. Such bending of outer arms 32 and 34 has the effect (when parts 13 and 40 are anchored to their respective supports) of forcing inner arms 26, 28, tongue 12 and junction portion 30 upwardly (as seen in FIG. 3) to one side of the plane formed by the surfaces of supports 58 and 60 which respectively abut and are connected to parts 13 and 40. This plane will hereinafter be referred to as the plane of supports 58 and 60. This also forces the contact-carrying end of actuator member 42 downwardly (as seen in FIG. 3) to the opposite side of the plane of supports 58 and 60.

When support 60 is displaced or moves away from support 58 in response to a predetermined increase in temperature, a pulling force is exerted on element 10 in a direction generally longitudinally of the element and in the plane of supports 58 and 60 which stresses outer arms 32, 34 and tongue 12 in tension and stresses inner arms 26 and 28 in compression. This pulling force further generates a torque in the area of element 10 adjacent end 13 of tongue 12, which causes tongue 12, arms 26, 28 and junction 30 first to move or rotate gradually downwardly in a clockwise direction (as seen in FIG. 3) about an axis which lies approximately along bend lines $a$, toward the plane of supports 58 and 60 to approach a critical directional configuration of stresses in parts 12, 26, 28, 32 and 34 or a so-called overcentering position beyond which tongue 12, arms 26, 28 and junction 30 will snap abruptly into a position below the plane of supports 58 and 60 which position is shown in broken lines in FIG. 3. Snapping parts 12, 26, 28 and 30 to the broken-line FIG. 3 position also causes actuator member 42 to snap upwardly from the solid-line (contacts-closed) position to the broken-line (contacts-open) position above the plane of supports 58 and 60 as shown in FIG. 3. The springy nature of the material forming element 10 and the flexible interconnection between inner arms 26, 28 and outer arms 32, 34 facilitate rotation of parts. Return from the broken-line to the solid-line FIG. 3 position occurs with snap action when support 60 moves back toward support 58, upon a decrease in temperature.

The position of contact 50 relative to contact 46 and to the plane of supports 58 and 60 may be adjusted to vary the separating gap between contacts 56 and 50 (when the parts are in the broken-line FIG. 3 position) and to also vary the amount of actuating displacement required to effect snapping of element 10. This provides a convenient means for calibrating the device to provide desired operational response to predetermined temperature conditions. The temperature at which snapping will occur can also be varied by prestressing the element 10 by initially adjustably spacing supports 58 and 60 apart by a predetermined distance.

For thermally responsive switch applications, such as shown in FIG. 2, it is preferred that element 10 be formed of a low coefficient of thermal expansion material such as Invar to minimize influence on the operation of element 10 by other parts of the switch to which it is fastened and which may be formed of a material having a relatively high coefficient of thermal expansion.

It will be seen from the above that element 10 has the advantage of generating loading and over-centering (or snap-acting) forces in response to a single actuating force or displacement and will translate such relatively small actuating displacements applied longitudinally of the element into a comparatively large amplified movement in a direction transversely of the element. Devices have been built according to the present invention, in which as little as a 0.0001″ displacement between supports (such as 58 and 60) will result in approximately a 0.012″ displacement of actuating arm 42 (in snapping from the solid-line to the broken-line positions of FIG. 3) providing an amplification ratio of approximately 120:1. Motion translating and amplifying elements have also been built according to this invention as small as 0.570″ long, 0.148″ wide and 0.006″ thick.

Motion translating and amplifying element 10 can also be used as a creep-acting device in the unformed condition thereof, i.e., without bends at $a$, $b$ and $c$, as shown in FIG. 4, by arranging supports 58 and 60 and contact 50 so that actuator arm 42 is confined to movement on one side only of the plane of supports 58 and 60. This can be done, for example, by raising stationary contact 50 so that its contact surface lies above the plane of supports 58 and 60 as seen in FIG. 3 to prevent overcentering action. In this condition actuator arm 42 is confined to movement only above the plane of supports 58 and 60 and movement of support 60 away from support 58 will cause actuator arm 42 to gradually move or creep upwardly to separate contacts 46 and 50, since the position of contact 50 prevents overcentering action.

It is to be understood that the actuating motion of member 42 can be used to actuate devices other than electrical contacts or switches, such as, for example, a valve, a toggle or lever mechanism, etc., or to operate other mechanical assemblies requiring this type of work input.

Further, actuating displacement between supports 58 and 60 can be effected manually, mechanically or in response to changes in conditions other than that of temperature.

The advantages of large motion amplification (i.e., the distance that actuator arm 42 moves relative to the displacement between support 58 and 60) is afforded by the device in both the creep-acting and the snap-acting forms.

In view of the above it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A snap-acting condition responsive electrical switch, including a pair of electrical contacts one of which is mounted on an actuator member for movement into and out of engagement with the other of said electrical contacts, first and second spaced support members; a motion translating and amplifying element comprising a plate formed for snap action having a first generally U-shaped slot extending in a first direction and relieving an inner elongate tongue having a first and a second end, said plate also having a second generally U-shaped slot extending in a direction opposite to said first direction; the sides of said first slot being disposed substantially parallel to and extending intermediate the sides of said second slot to form a first pair of substantially parallel spaced-apart side arms; said plate including a junction portion integrally interconnecting one end of said first pair of arms with said first end of said inner tongue; the sides of said second slot also forming an outer pair of substantially parallel spaced-apart arms; each of said outer pair of arms being integrally interconnected adjacent one end thereof with a tab extension; the other end of each of said outer pair of arms being flexibly and integrally interconnected with the other end of a respective one of said first pair of arms and also with an actuator member extending beyond said second end of said inner tongue; said tab being anchored to said support member and said second end of said tongue being anchored to said second support member, said outer pair of arms being bent adjacent said second end of said tongue to force said first pair of arms, inner tongue, junction portion and actuator member to a first position in which said pair of arms, inner tongue and junction portion are located to one side of the plane of the support members and the actuator member is located to the other side of said plane; said junction portion being bent adjacent its interconnection with said one end of said first pair of arms and adjacent its interconnection with said first end of said inner tongue; whereby movement of said support member in a direction parallel to the plane of the support members causes said first pair of arms to operate in compression and said inner tongue and outer pair of arms to operate in tension and causes said first pair of arms, inner tongue and junction portion to move gradually toward said plane of said support members and then to move with snap action to a second position in which said first pair of arms, inner tongue and junction portion are on the other side of said plane and causes said actuator member to move with snap action to said one side of said plane.

2. The switch as set forth in claim 1 wherein said switch is thermally responsive and includes thermally responsive means for causing movement of said first support member relative to said second support member in response to predetermined temperature change and wherein said thermally responsive means comprises a rod and tube formed of materials such as to produce differential expansion between said rod and tube in response to temperature change; and one end of said rod comprising said first support member.

References Cited by the Examiner

UNITED STATES PATENTS 2,697,145  12/54  Winet _____ 200—67

FOREIGN PATENTS 1,158,416  1/58  France.
431,798  7/35  Great Britain.

KATHLEEN H. CLAFFY, *Primary Examiner.*

ROBERT K. SCHAEFER, BERNARD A. GILHEANY,
*Examiners.*